(12) United States Patent
Lee et al.

(10) Patent No.: US 8,369,687 B2
(45) Date of Patent: Feb. 5, 2013

(54) ELECTRONIC DEVICE AND METHOD FOR EMBEDDING PRODUCT INFORMATION IN VIDEOS WITH PRODUCT PLACEMENTS

(75) Inventors: Chung-I Lee, New Taipei (TW); Chien-Fa Yeh, New Taipei (TW); Ho-I Sun, New Taipei (TW); Shan-Chuan Jeng, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 41 days.

(21) Appl. No.: 13/213,093

(22) Filed: Aug. 19, 2011

(65) Prior Publication Data

US 2012/0099841 A1 Apr. 26, 2012

(30) Foreign Application Priority Data

Oct. 26, 2010 (TW) .............................. 99136430 A

(51) Int. Cl.
*H04N 9/80* (2006.01)
(52) U.S. Cl. ...................................... 386/249; 386/250

(58) Field of Classification Search .................. 386/249, 386/250, 248, 239, 240, 241, 245, 246
See application file for complete search history.

(56) References Cited

U.S. PATENT DOCUMENTS 6,662,007 B2 * 12/2003 Yuen .............................. 455/419
7,516,472 B2 * 4/2009 Danker et al. .................. 725/87

\* cited by examiner

*Primary Examiner* — Robert Chevalier
(74) *Attorney, Agent, or Firm* — Altis Law Group, Inc.

(57) ABSTRACT

A method embeds product information in videos with product placements using an electronic device. The electronic device defines product information of one or more products that are embedded in a video, and embeds the product information in an image file having a file format that is compatible with the video, the embedding according to appearance times of the one or more products. During display of the video on the display device, the electronic device determines whether the image file includes product information about a product that is presented during display of the video. If the image file includes product information about the product, the electronic device displays a prompt on the display device concurrently with the product. After receiving a selection operation to select the prompt, the electronic device displays the product information on the display device.

20 Claims, 4 Drawing Sheets

ELECTRONIC DEVICE AND METHOD FOR EMBEDDING PRODUCT INFORMATION IN VIDEOS WITH PRODUCT PLACEMENTS

BACKGROUND

1. Technical Field

Embodiments of the present disclosure generally relate to advertisement displaying devices and methods, particularly to an electronic device and method for embedding product information in videos with product placements.

2. Description of Related Art

Product placement is increasingly becoming a popular form of advertising in media environments, especially with the growing use of digital recording devices, which allow viewers to skip commercials. While there are numerous advantages to this marketing strategy, one major disadvantage is that the viewers have no concrete information on what the product is or even where to purchase it. This lack of information can influence the effectiveness of this type of advertising.

DETAILED DESCRIPTION

In general, the data "module," as used herein, refers to logic embodied in hardware or firmware, or to a collection of software instructions, written in a programming language, such as, for example, Java, C, or assembly. One or more software instructions in the modules may be embedded in firmware, such as in an EPROM. It will be appreciated that modules may comprise connected logic units, such as gates and flip-flops, and may comprise programmable units, such as programmable gate arrays or processors. The modules described herein may be implemented as either software and/or hardware modules and may be stored in any type of non-transitory computer-readable medium or other computer storage device.

Figure 1:
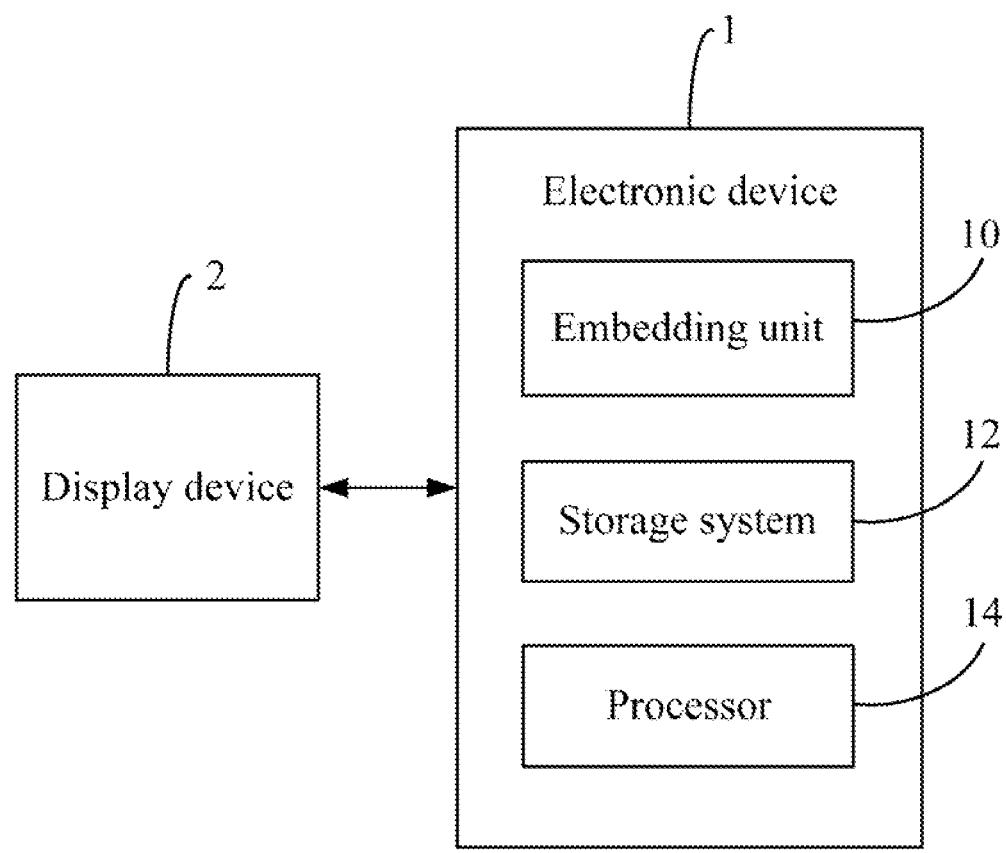
FIG. 1 is a block diagram of one embodiment of an electronic device including an embedding unit.

FIG. 1 is a block diagram of one embodiment of an electronic device 1 including an embedding unit 10. In the embodiment, functions of the embedding unit 10 are implemented by the electronic device 1. The embedding unit 10 can embed product information such as advertisements of products presented in a video, and display the product information on a display device 2 that is electronically connected to the electronic device 1 via a wired or wireless connection. In the embodiment, the product information of a product is information related to size, shape, materials, and price of the product, for example. The advertisements of the products may be presented using, for example, text, audio, advertisement files, Web advertisements, and/or shopping websites. The video may be a TV program, such as a movie, a TV series, or any other entertainment shown on a TV or a computer. In one embodiment, the products may be cars, watches, or clothes.

In one embodiment, the electronic device 1 may be a computer, a TV, a portable electronic device, or any other electronic device that includes a storage system 12 and at least one processor 14.

The embedding unit 10 is configured to store product information of one or more products that are embedded in a video, and embed the product information in an image file having a file format that is compatible with the video, the embedding according to appearance times of the one or more products. Once the image file includes product information about a product that is presented on the display device 2 during display of the video, the embedding unit 10 displays a prompt on the display device 2 concurrently with the video. In the embodiment, the prompt displayed on the display device 2 does not stop the video from playing. When a user selects the prompt, the embedding unit 10 exports the product information of the product, and displays the product information on the display device 2.

Figure 4:
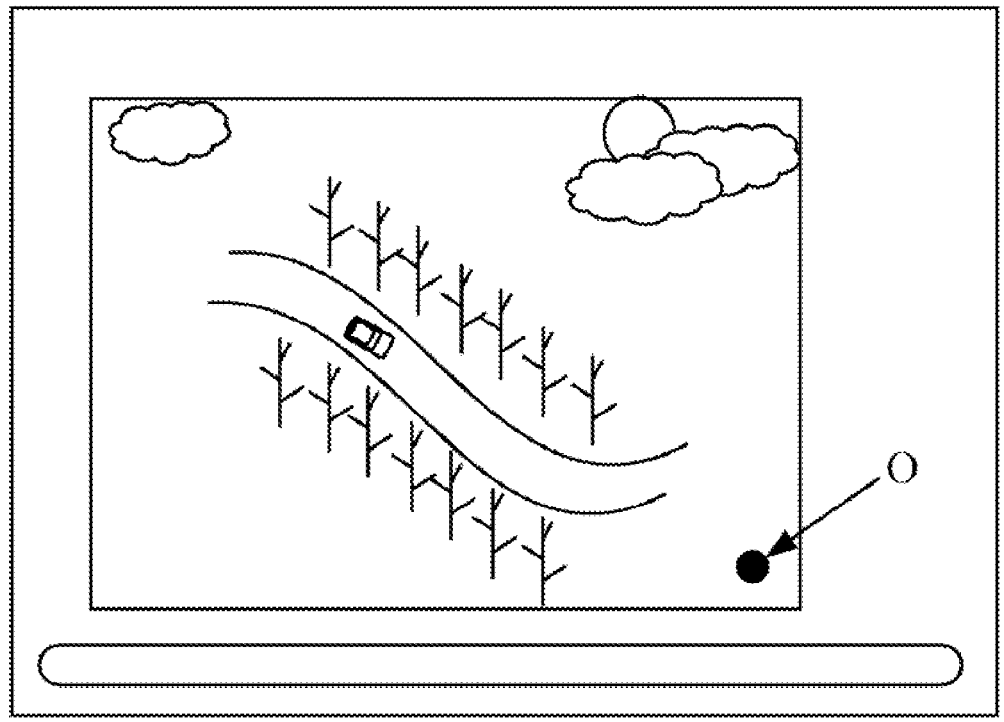
FIG. 4 is a schematic diagram illustrating one example of displaying a prompt in a video.

In one embodiment, the embedding unit 10 displays the product information of the product when the video ends or is paused. The prompt can be displayed near the product displayed on the display device 2, or in the periphery of a display screen of the display device 2, such as an upper left corner, an upper right corner, a lower left corner, or a lower right corner of a display screen of the display device 2. As illustrated in FIG. 4, the prompt in this embodiment is a black dot labeled "O" displayed in the lower right corner of the display screen.

Figure 2:
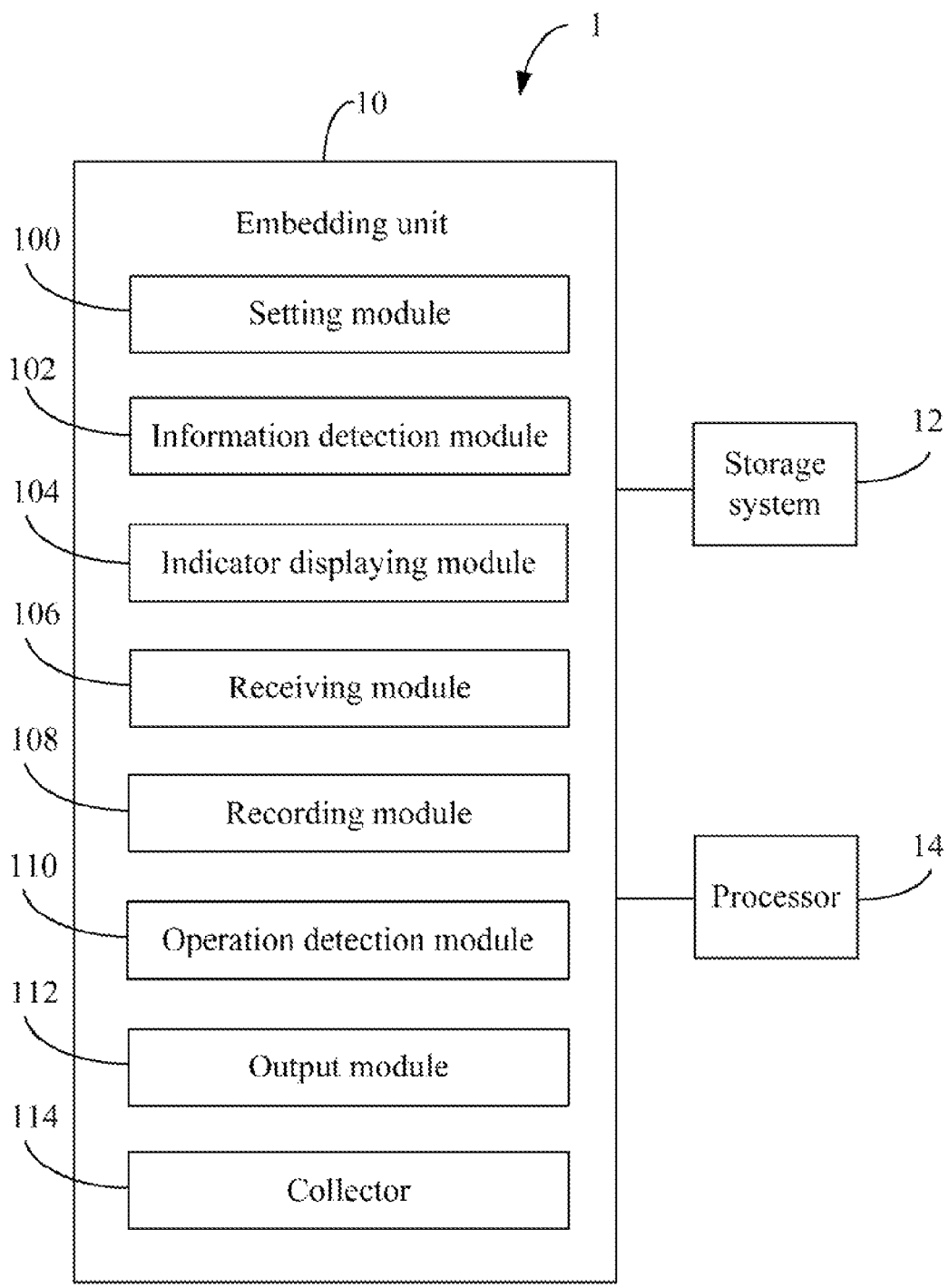
FIG. 2 is a block diagram of one embodiment of function modules of the embedding unit of FIG. 1.

FIG. 2 is a block diagram of one embodiment of function modules of the embedding unit 10 of FIG. 1. In one embodiment, the embedding unit 10 includes a setting module 100, an information determination module 102, an indicator displaying module 104, a receiving module 106, a recording module 108, an operation determination module 110, and an output module 112. Each of the modules 100-112 may be a software program including one or more computerized instructions that are stored in the storage system 12 and executed by the processor 14.

In one embodiment, the storage system 12 may be a magnetic or an optical storage system, such as a hard disk drive, an optical drive, or a tape drive.

The setting module 100 defines the product information of the one or more products that are embedded in a video, and embeds the product information in an image file having a file format that is compatible with the video, the embedding according to appearance times of the one or more products in the video. In one embodiment, the product information may be advertisements of the products.

When the electronic device 2 displays the video on the display device 2, the information determination module 102 determines whether the image file includes product information about a product that is presented. If the image file includes the product information about the product that is presented, the indicator displaying module 104 displays a prompt on the display device 2 concurrently with the product.

In the embodiment, the user can use the setting module 100 to set color and shape of the prompt (such as a colored dot), enclose an area of the video in a graphic box, and define the graphic box as a display area of the prompt. The graphic box can be a rectangle, a circle, lines, or a shape pre-drawn by the user. In the embodiment, a size of the graphic box can be set according to a displayed size of the prompt displayed on the display device 2. The prompt can be displayed near the product, or in the periphery of the display screen of the display device 2, such as a lower right corner of the display device 2 as shown in FIG. 4.

In the embodiment, the setting module 100 further sets a start time and an end time of the prompt to be presented on the video according to the appearance time of the product.

When the display device 2 displays the video, the operation determination module 110 determines whether a viewer selects the prompt by touching a button of the prompt. In one embodiment, the button can be predefined as a virtual key or a physical key. For example, the button can be preset as the prompt itself. If the display device 2 is a touch-sensitive display, the viewer may use a finger to touch the prompt as shown in FIG. 4. In the embodiment, if the viewer selects the prompt, the receiving module 106 receives a selection operation of selecting the prompt, and the recording module 108 records the product information of the product in a collector. In the embodiment, the collector is a temporary storage unit (e.g., flash memory, RAM) that saves the product information to be shown to the viewer.

In the embodiment, the user can preset a button of the electronic device 1 in order to control functions of the collector, such as a function of importing product information from the collector. The button can be preset as a virtual key or a physical key. For example, if the electronic device 1 is a TV, the button can be a button on the TV and/or a remote control of the TV. If the electronic device 1 is a computer, the button can be a keyboard button of the computer.

The operation determination module 110 determines whether the button of the collector is operated during the video broadcasting.

Upon the condition that the button of the collector is operated during the video broadcasting, the output module 112 pauses the video, exports the product information from the collector, and displays the product information of the product on the display device 2. Upon the condition that the button is not operated during the video broadcasting, the output module 112 exports the product information of the product from the collector, and displays the product information on the display device 1 after the video ends.

Figure 3:
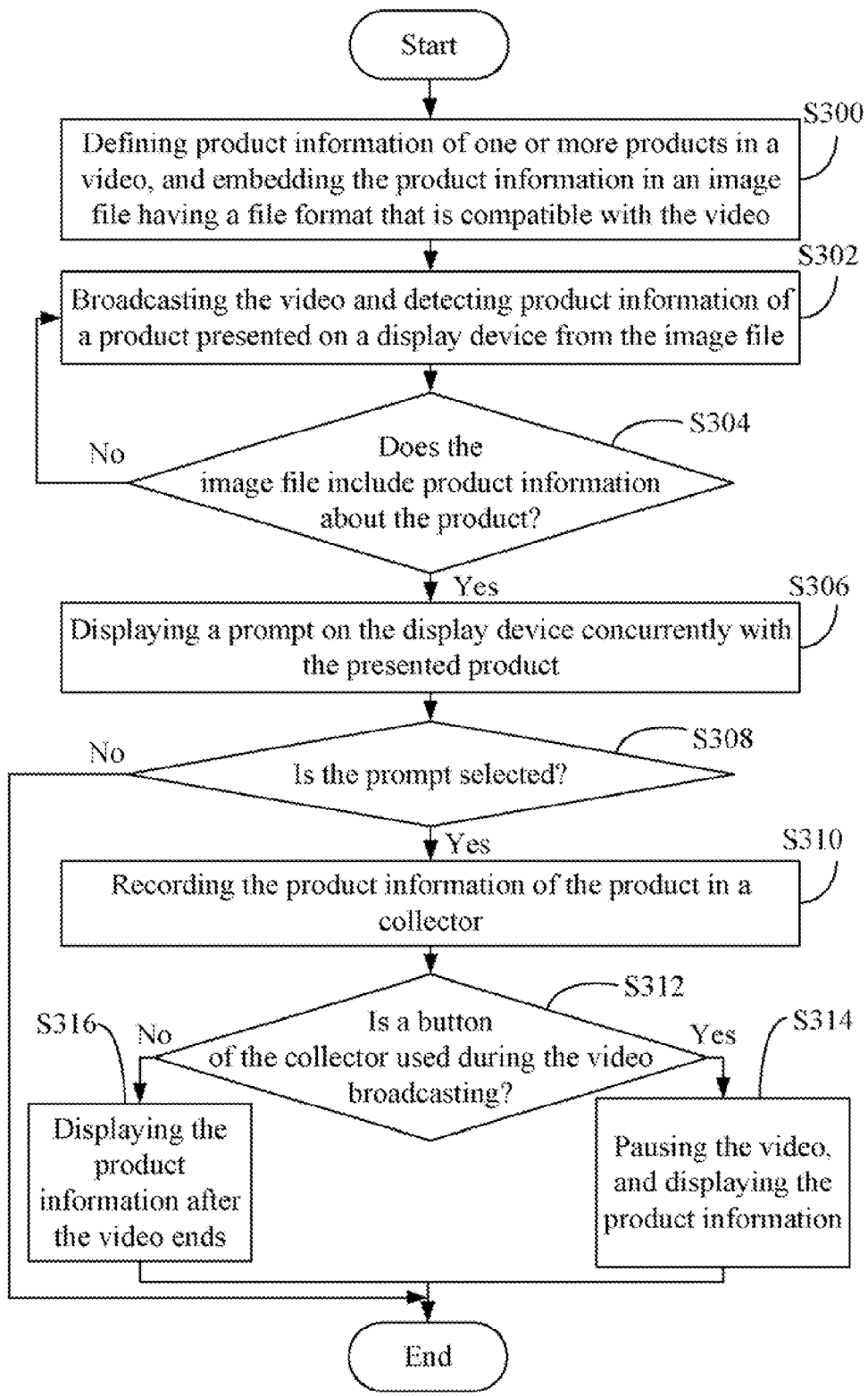
FIG. 3 is a flowchart illustrating one embodiment of a method for embedding product information in videos with product placements.

FIG. 3 is a flowchart illustrating one embodiment of a method for embedding product information in videos with product placements. Depending on the embodiment, additional blocks may be added, others removed, and the ordering of the blocks may be changed.

In block S300, the setting module 100 defines product information of the one or more products that are embedded in a video, and embeds the product information in an image file having a file format that is compatible with the video, the embedding according to appearance times of the one or more products in the video. The image file may be in a MPEG-2, MPEG-4, or an AVC format.

In block S302, when the electronic device 2 displays the video, the information determination module 102 detects product information of a product presented on the display device 2 from the image file. In block S304, the information determination module 102 further determines whether the image file includes product information about the product that is presented. If the image file includes the product information about the product that is presented, block S306 is implemented. If the image file does not include the product information about the product, block S302 is repeated to detect product information of a next product presented on the display device 2.

In block S306, the indicator displaying module 104 displays a prompt on the display device 2 concurrently with the product. In the embodiment, the prompt displayed on the display device 2 does not stop the video from playing. The setting module 100 can define color and shape of the prompt, defines a display area of the prompt, and sets a start time and an end time of the prompt to be presented on the video according to the appearance time of the product. The prompt may be displayed nears the product, or in the periphery of the display screen of the display device 2, such as a lower right corner of the display device 2 as shown in FIG. 4. In the embodiment, a button can be preset for responding to the prompt. In one embodiment, the button can be predefined as a virtual key or a physical key, for example, the button can be preset as the prompt itself.

In block S308, the operation determination module 110 determines whether a viewer selects the prompt by using the button of the prompt when the display device 2 displays the video. For example, if the display device 2 is a touch-sensitive display, the operation determination module 110 determines whether a viewer touches the prompt as shown in FIG. 4. If the viewer selects the prompt, block S310 is implemented. If the prompt is not selected by the viewer, the flow ends.

In block S310, the receiving module 106 receives a selection operation to select the prompt from the viewer, and the recording module 108 records the product information of the product in a collector. In the embodiment, the collector is a temporary storage unit for saving the product information to be shown to the viewer.

In block S312, the operation determination module 110 determines whether a button of the collector is operated during the video broadcasting. In the embodiment, the button can be preset as a software key or a physical key. For example, if the electronic device 1 is a TV, the button can be equipped with a rocking handle of the electronic device 1. If the electronic device 1 is a computer, the button of the collector can be preset on a keyboard electronically connected to the computer.

If the button of the collector is operated during the video broadcasting, in block S314, the output module 112 pauses the video, exports the product information from the collector, and displays the product information of the product on the display device 2.

If the button of the collector is not operated during the video broadcasting, the output module 112 exports the product information of the product from the collector, and displays the product information on the display device 1 after the video ends.

All of the processes described above may be embodied in, and fully automated via, functional code modules executed by one or more general purpose processors of electronic devices. The code modules may be stored in any type of non-transitory readable medium or other storage device. Some or all of the methods may alternatively be embodied in specialized hardware. Depending on the embodiment, the non-transitory readable medium may be a hard disk drive, a compact disc, a digital video disc, a tape drive or other suitable storage medium.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computer-implemented method using an electronic device electronically connected to a display device, comprising:
   (a) defining product information of one or more products that are embedded in a video, and embedding the product information in an image file having a file format that is compatible with the video, the embedding according to appearance times of the one or more products in the video;

(b) during display of the video on the display device, determining whether the image file comprises product information about a product that is presented during display of the video;

(c) in response to the determination that the image file comprises product information about the product, displaying a prompt on the display device concurrently with the product;

(d) receiving a selection operation to select the prompt; and (e) displaying the product information of the product on the display device.

2. The method as described in claim 1, further comprising: recording the product information of the product in a collector in response to receiving the selection operation.

3. The method as described in claim 2, wherein the block (e) comprises:
determining whether the collector is operated during the video broadcasting; and
pausing the video and exporting the product information from the collector to the display device, upon the condition that the collector is operated during the video broadcasting; or
exporting the product information from the collector to the display device after the video ends, upon the condition that the button is not operated during the video broadcasting.

4. The method as described in claim 1, further comprising: defining color and shape of the prompt;
enclosing an area of the video in a graphic box, and defining the graphic box with the area as a display area of the prompt; and
setting a start time and an end time of the prompt to be presented on the video according to the appearance time of the product.

5. The method as described in claim 4, further comprising: defining a size of the graphic box according to a displayed size of the prompt displayed on the display device.

6. The method as described in claim 1, wherein the prompt displayed on the display device does not stop the video from playing.

7. The method as described in claim 1, wherein the product information is delivered using text, audio, advertisement files, web advertisements, and/or shopping websites.

8. An electronic device, comprising:
at least one processor;
a storage system; and
one or more modules that are stored in the storage system and executed by the at least one processor, the one or more modules comprising:
a setting module operable to define product information of one or more products that are embedded in a video, and embedding the product information in an image file having a file format that is compatible with the video, the embedding according to appearance times of the one or more products in the video;
an information determination module operable to determine whether the image file comprises product information about a product that is presented during display of the video during display of the video on the display device, the display device electronically connected to the electronic device;
an indicator displaying module operable to display a prompt on the display device concurrently with the product, in response to the determination that the image file comprises product information about the product; and
a receiving module operable to receive a selection operation to select the prompt; and
an output module operable to display the product information of the product on the display device.

9. The electronic device as described in claim 8, further comprising:
a recording module operable to record the product information of the product in a collector in response to receiving the selection operation.

10. The electronic device as described in claim 9, further comprising:
an operation determination module operable to determine whether the collector is operated during the video broadcasting.

11. The electronic device as described in claim 10, wherein the output module is further operable to pause the video and export the product information from the collector to the display device upon the condition that the collector is operated during the video broadcasting, or export the product information from the collector to the display device after the video ends upon the condition that the button is not operated during the video broadcasting.

12. The electronic device as described in claim 8, wherein the setting module is further operable to define color and shape of the prompt, enclose an area of the video in a graphic box, define the graphic box with the area as a display area of the prompt, and define a size of the graphic box according to a displayed size of the prompt displayed on the display device.

13. The electronic device as described in claim 8, wherein the setting module is further operable to set a start time and an end time of the prompt to be presented on the video according to the appearance time of the product.

14. The electronic device as described in claim 8, wherein the prompt displayed on the display device does not stop the video from playing.

15. The electronic device as described in claim 8, wherein the product information is delivered using text, audio, advertisement files, web advertisements, and/or shopping websites.

16. A non-transitory storage medium having stored thereon instructions that, when executed by a processor of an electronic device, causes the processor to perform a method for embedding product information in videos with product placements, the method comprising:
(a) defining product information of one or more products that are embedded in a video, and embedding the product information in an image file having a file format that is compatible with the video, the embedding according to appearance times of the one or more products in the video;
(b) during display of the video on the display device, determining whether the image file comprises product information about a product that is presented during display of the video;
(c) in response to the determination that the image file comprises product information about the product, displaying a prompt on the display device concurrently with the product;
(d) receiving a selection operation to select the prompt; and
(e) displaying the product information of the product on the display device.

17. The storage medium as described in claim 16, wherein the method further comprises:

recording the product information of the product in a collector in response to receiving the selection operation.

18. The storage medium as described in claim 17, wherein the block (e) comprises:
   determining whether the collector is operated during the video broadcasting; and
   pausing the video and exporting the product information from the collector to the display device, upon the condition that the collector is operated during the video broadcasting; or
   exporting the product information from the collector to the display device after the video ends, upon the condition that the button is not operated during the video broadcasting.

19. The storage medium as described in claim 16, wherein the method further comprises:
   defining color and shape of the prompt;
   enclosing an area of the video in a graphic box, and defining the graphic box with the area as a display area of the prompt; and
   setting a start time and an end time of the prompt to be presented on the video according to the appearance time of the product.

20. The storage medium as described in claim 16, wherein the prompt displayed on the display device does not stop the video from playing.

\* \* \* \* \*